US012786964B2

(12) United States Patent
Pan et al.

(10) Patent No.: US 12,786,964 B2
(45) Date of Patent: Nov. 3, 2026

(54) DATA TRANSMISSION METHOD AND APPARATUS

(71) Applicant: HUAWEI TECHNOLOGIES CO., LTD., Shenzhen (CN)

(72) Inventors: Dao Pan, Dongguan (CN); Zefeng Lin, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 338 days.

(21) Appl. No.: 18/632,592

(22) Filed: Apr. 11, 2024

(65) Prior Publication Data

US 2024/0267899 A1 Aug. 8, 2024

Related U.S. Application Data

(63) Continuation of application No. PCT/CN2021/129563, filed on Nov. 9, 2021.

(51) Int. Cl.
*H04W 72/0446* (2023.01)
*H04L 1/00* (2006.01)
(Continued)

(52) U.S. Cl.
CPC ....... *H04W 72/0446* (2013.01); *H04L 1/0003* (2013.01); *H04W 72/0453* (2013.01); *H04L 5/0007* (2013.01)

(58) Field of Classification Search
None
See application file for complete search history.

(56) References Cited

U.S. PATENT DOCUMENTS

| | | | | |
|---|---|---|---|---|
| 10,999,025 B2 * | 5/2021 | Matsumura | ............. | H04L 27/26 |
| 2010/0151876 A1 * | 6/2010 | Park | .................... | H04W 72/541 455/452.2 |

(Continued)

FOREIGN PATENT DOCUMENTS

| | | |
|---|---|---|
| CN | 102113233 A | 6/2011 |
| CN | 102696210 A | 9/2012 |

(Continued)

OTHER PUBLICATIONS

ETSI Technical Report Powerline Telecommunications (PLT), "Powerline communication recommendations for smart metering and home automation", ETSI TR 103 240 V1.1.1,Nov. 31, 2014(Jan. 31, 2014), total 15 pages.

(Continued)

*Primary Examiner* — Anh Vu H Ly
(74) *Attorney, Agent, or Firm* — WOMBLE BOND DICKINSON (US) LLP

(57) ABSTRACT

Embodiments of this application disclose a data transmission method and apparatus, and relate to the communication field, to improve reliability of data transmission in a power line communication system. A master device allocates a first time-frequency resource block to a terminal device, where the first time-frequency resource block is determined based on an available frequency band locally stored in the master device, the available frequency band includes M consecutive subcarriers, each OFDM symbol in the first time-frequency resource block includes N discrete subcarriers in frequency domain, and M is greater than N; and the master device transmits data to the terminal device on the first time-frequency resource block.

14 Claims, 9 Drawing Sheets

(51) Int. Cl.

| | |
|---|---|
| ***H04W 72/0453*** | (2023.01) |
| *H04L 5/00* | (2006.01) |

(56) References Cited

U.S. PATENT DOCUMENTS

| | | | | |
|---|---|---|---|---|
| 2019/0334680 | A1* | 10/2019 | Li | H04L 5/0051 |
| 2021/0152272 | A1* | 5/2021 | Kimura | H04L 27/26025 |
| 2021/0194741 | A1* | 6/2021 | Hao | H04L 27/26025 |
| 2022/0006487 | A1* | 1/2022 | Barois | H04B 3/54 |
| 2022/0295472 | A1* | 9/2022 | Matsumura | H04W 72/0453 |

FOREIGN PATENT DOCUMENTS

| | | | |
|---|---|---|---|
| CN | 103297188 | A | 9/2013 |
| CN | 104301009 | A | 1/2015 |
| WO | 2006052235 | A1 | 5/2006 |

OTHER PUBLICATIONS

Homeplug AV and IEEE 1901, A Handbook for PLC Designers and Users, (Jan. 8, 2013), total 374 pages.

Series G: Transmission Systems and Media, Digital Systems and Networks, Access networks In premises networks, Unified high-speed wire-line based home networking transceivers System architecture and physical layer specification, ITU-T G.9960, (Nov. 2018), total 150 pages.

* cited by examiner (a)

(b)

(c)

(a)

(b)

(a)

(b)

DATA TRANSMISSION METHOD AND APPARATUS

CROSS-REFERENCE TO RELATED APPLICATIONS

This application is a continuation of International Application No. PCT/CN2021/129563, filed on Nov. 9, 2021, the disclosure of which is hereby incorporated by reference in its entirety.

TECHNICAL FIELD

Embodiments of this application relate to the field of communication technologies, and in particular, to a data transmission method and apparatus.

BACKGROUND

A power line communication (PLC) technology means to transmit data or information by using an existing power line. When the power line communication technology is used, basically there is no need to re-lay a network line. In addition, because the power line has a wide coverage, the technology is widely applied in the communication field. As shown in FIG. 1, when power line communication is used, because load impedance on a line changes in real time, a channel presents very obvious frequency selective fading. As a result, a signal-to-noise ratio (SNR) between different carriers may fluctuate sharply, which affects reliability of data transmission.

To improve reliability of data transmission in power line communication, data may be transmitted by using a robust communication mode (RCM) defined in the International Telecommunication Union ITU-T G.hn protocol or a robust mode of communication (ROBO) defined in the HomePlug Powerline Alliance HomePlug protocol. In the RCM mode or the ROBO mode, data is repeatedly coded and modulated onto a plurality of orthogonal frequency division multiplexing (OFDM) symbols, to implement time-frequency domain interleaving between payload data blocks, so that data can be transmitted more reliably in power line communication. In the field of power line communication, to implement multi-user access, the RCM mode or the ROBO mode may be combined with an orthogonal frequency division multiple access (OFDMA) technology. However, when a resource block (RB) is allocated to each user based on RB division manner in OFDMA, payload data of each user is concentrated on a small segment of consecutive subcarriers. Due to strong frequency selective fading or interference in power line communication, the small segment of consecutive subcarriers of each user may encounter large deep fading or interference, which reduces communication reliability of the user. Therefore, when the RCM mode or the ROBO mode is combined with the OFDMA technology, low communication reliability may be caused.

SUMMARY

Embodiments of this application provide a data transmission method and apparatus, to improve reliability of data transmission.

To achieve the foregoing objectives, the following technical solutions are used in embodiments of this application.

According to a first aspect of embodiments of this application, a data transmission method is provided. The method may be applied to the field of power line communication, or may be applied to another wired communication field. First, a master device allocates a first time-frequency resource block to a terminal device. The first time-frequency resource block is determined based on an available frequency band locally stored in the master device, the available frequency band includes M consecutive subcarriers, an OFDM symbol in the first time-frequency resource block includes N discrete subcarriers in frequency domain, and M is greater than N. Then, the master device transmits data to the terminal device on the first time-frequency resource block.

A quantity of OFDM symbols included in the first time-frequency resource block is not limited in this solution. A plurality of discrete subcarriers included in each OFDM symbol in the first time-frequency resource block in frequency domain all are determined based on the available frequency band locally stored in the master device.

A specific rule for determining the first time-frequency resource block from the available frequency band is not limited in this solution, and any rule for determining a plurality of discrete subcarriers from a plurality of consecutive subcarriers falls within the protection scope of this solution. For example, quantities of pluralities of discrete subcarriers included in different OFDM symbols in the first time-frequency resource block in frequency domain may be the same or may be different. For another example, in the N discrete subcarriers included in the OFDM symbol in the first time-frequency resource block in frequency domain, quantities of subcarriers spaced between two neighboring subcarriers may be the same or may be different. For still another example, comb-shaped division manners of N discrete subcarriers included in different OFDM symbols in the first time-frequency resource block in frequency domain may be the same or may be different.

Based on this solution, because the first time-frequency resource block is a comb-shaped resource block obtained through division based on consecutive time-frequency resources, subcarriers in the first time-frequency resource block are discrete. Compared with the conventional technology in which data is transmitted on a small segment of consecutive subcarriers, in this solution, because the first time-frequency resource block is discrete, frequency selective characteristics of all discrete subcarriers in the first time-frequency resource block are basically consistent with frequency selective characteristics of all subcarriers in the available frequency band, so that reliability of data transmission can be improved when data is transmitted on the first time-frequency resource block.

In an embodiment, in transmitting data to the terminal device on the first time-frequency resource block, the master device transmits the data to the terminal device on the first time-frequency resource block based on a duplicated modulation and coding scheme.

Based on this solution, data is transmitted based on the duplicated modulation and coding scheme, so that a plurality of copies of the data can be obtained through duplication, and the plurality of pieces of duplicated data are modulated onto the first time-frequency resource block. Therefore, when a part of the data fails to be transmitted in a carrier band with a low SNR, the segment of data can still be successfully transmitted in a carrier band with a high SNR, thereby improving reliability of data transmission.

In another embodiment, that the master device transmits the data to the terminal device on the first time-frequency resource block based on a duplicated modulation and coding scheme includes: The master device transmits the data to the terminal device on the first time-frequency resource block based on an RCM or a ROBO mode.

Based on this solution, data is repeatedly coded through RCM or ROBO and modulated onto a plurality of OFDM symbols, so that when a segment of data fails to be transmitted in a carrier band with a low SNR, the segment of data can still be successfully transmitted in a carrier band with a high SNR, thereby improving transmission reliability of each segment of data.

In an embodiment, a same quantity of subcarriers are spaced between two neighboring subcarriers in the N discrete subcarriers.

Based on this solution, when the first time-frequency resource block is determined based on the available frequency band, a resource in the first time-frequency resource block may be obtained through division at intervals of a same quantity of subcarriers, so that a same quantity of subcarriers are spaced between two neighboring subcarriers in the N discrete subcarriers in the first time-frequency resource block. In other words, in this solution, the first time-frequency resource block is obtained through even comb-shaped division in the M consecutive subcarriers included in the available frequency band. Optionally, the first time-frequency resource block may alternatively be obtained through uneven comb-shaped division in the M consecutive subcarriers included in the available frequency band.

In an embodiment, locations of the N discrete subcarriers are related to a quantity of divided resources and an initial subcarrier location.

In an embodiment, initial subcarrier locations of different OFDM symbols in the first time-frequency resource block may be the same or may be different.

Based on this solution, discrete subcarriers corresponding to each OFDM symbol in the first time-frequency resource block may be determined from the available frequency band based on the quantity of divided resources and the initial subcarrier location, so that sizes of resources in a plurality of first time-frequency resource blocks obtained from the available frequency band through division are similar.

In an embodiment, the quantity of divided resources is K, and the quantity of subcarriers spaced between two neighboring subcarriers is K−1.

Based on this solution, when discrete subcarriers corresponding to each OFDM symbol in the first time-frequency resource block are determined from the available frequency band, a resource in the first time-frequency resource block may be obtained through division at intervals of (K−1) subcarriers, so that the quantity of subcarriers spaced between two neighboring subcarriers in the N discrete subcarriers in the first time-frequency resource block is K−1.

In an embodiment, when the M consecutive subcarriers are M consecutive available subcarriers, the quantity of subcarriers spaced between two neighboring subcarriers is a quantity of available subcarriers.

Based on this solution, when discrete subcarriers corresponding to each OFDM symbol in the first time-frequency resource block are determined from the available frequency band, N discrete subcarriers may be determined from M consecutive available subcarriers. In this case, a quantity of subcarriers spaced between two neighboring subcarriers in the N discrete subcarriers is a quantity of available subcarriers.

In an embodiment, when the M consecutive subcarriers are M consecutive physical subcarriers, the quantity of subcarriers spaced between two neighboring subcarriers is a quantity of physical subcarriers.

Based on this solution, when discrete subcarriers corresponding to each OFDM symbol in the first time-frequency resource block are determined from the available frequency band, N discrete subcarriers may be determined from M consecutive physical subcarriers. In this case, a quantity of subcarriers spaced between two neighboring subcarriers in the N discrete subcarriers is a quantity of physical subcarriers.

In an embodiment, when transmitting data to the terminal device on the first time-frequency resource block, the master device sends data to the terminal device on the first time-frequency resource block, or the master device receives data from the terminal device on the first time-frequency resource block.

Based on this solution, the master device may send data to the terminal device on the first time-frequency resource block, or may receive data from the terminal device on the first time-frequency resource block. Because the first time-frequency resource block in this solution is discrete, the frequency selective characteristics of all the discrete subcarriers in the first time-frequency resource block are basically consistent with the frequency selective characteristics of all the subcarriers in the available frequency band, so that reliability of data transmission can be improved when data is received and transmitted on the first time-frequency resource block.

In an embodiment, the master device sends scheduling information to the terminal device. The scheduling information includes indication information indicating a time-frequency resource location of the first time-frequency resource block corresponding to the terminal device.

Based on this solution, the master device may send, to the terminal device, the indication information indicating the time-frequency resource location of the first time-frequency resource block corresponding to the terminal device, so that the terminal device can transmit data on the first time-frequency resource block, to improve reliability of data transmission of the terminal device.

According to a second aspect of embodiments of this application, a data transmission method is provided. The method may be applied to the field of power line communication, or may be applied to another wired communication field. First, a terminal device receives scheduling information from a master device, where the scheduling information includes indication information indicating a time-frequency resource location of a first time-frequency resource block corresponding to the terminal device. The first time-frequency resource block is determined based on an available frequency band locally stored in the master device, the available frequency band includes M consecutive subcarriers, an OFDM symbol in the first time-frequency resource block includes N discrete subcarriers in frequency domain, and M is greater than N. Then, the terminal device transmits data on the first time-frequency resource block based on the scheduling information.

Based on this solution, because the first time-frequency resource block is a comb-shaped resource block obtained from consecutive time-frequency resources through division, subcarriers in the first time-frequency resource block are discrete. Compared with the conventional technology in which data is transmitted on a small segment of consecutive subcarriers, in this solution, because the first time-frequency resource block is discrete, frequency selective characteristics of all discrete subcarriers in the first time-frequency resource block are basically consistent with frequency selective characteristics of all subcarriers in the available frequency band, so that reliability of data transmission can be improved when the terminal device transmits data on the first time-frequency resource block.

In an embodiment, when transmitting data on the first time-frequency resource block based on the scheduling information, the terminal device transmits the data on the first time-frequency resource block based on a duplicated modulation and coding scheme.

Based on this solution, data is transmitted based on the duplicated modulation and coding scheme, so that a plurality of copies of the data can be obtained through duplication, and the plurality of pieces of duplicated data are modulated onto the first time-frequency resource block. Therefore, when a part of the data fails to be transmitted in a carrier band with a low SNR, the segment of data can still be successfully transmitted in a carrier band with a high SNR, thereby improving reliability of data transmission.

In an embodiment, when transmitting the data on the first time-frequency resource block based on a duplicated modulation and coding scheme and the scheduling information, the terminal device transmits the data on the first time-frequency resource block based on an RCM or a ROBO mode.

Based on this solution, data is repeatedly coded through RCM or ROBO and modulated onto a plurality of OFDM symbols, so that when a segment of data fails to be transmitted in a carrier band with a low SNR, the segment of data can still be successfully transmitted in a carrier band with a high SNR, thereby improving transmission reliability of each segment of data.

In an embodiment, a same quantity of subcarriers are spaced between two neighboring subcarriers in the N discrete subcarriers.

Based on this solution, when discrete subcarriers corresponding to each OFDM symbol in the first time-frequency resource block are determined from the available frequency band, a resource in the first time-frequency resource block may be obtained through division at intervals of a same quantity of subcarriers, so that a same quantity of subcarriers are spaced between two neighboring subcarriers in the N discrete subcarriers in the first time-frequency resource block.

In an embodiment, locations of the N discrete subcarriers are related to a quantity of divided resources and an initial subcarrier location.

Based on this solution, discrete subcarriers corresponding to each OFDM symbol in the first time-frequency resource block may be determined from the available frequency band based on the quantity of divided resources and the initial subcarrier location, so that sizes of resources in a plurality of first time-frequency resource blocks obtained from the available frequency band through division are similar.

In an embodiment, the quantity of divided resources is K, and the quantity of subcarriers spaced between two neighboring subcarriers is K−1.

Based on this solution, when discrete subcarriers corresponding to each OFDM symbol in the first time-frequency resource block are determined from the available frequency band, a resource in the first time-frequency resource block may be obtained through division at intervals of (K−1) subcarriers, so that the quantity of subcarriers spaced between two neighboring subcarriers in the N discrete subcarriers in the first time-frequency resource block is K−1.

In an embodiment, when the M consecutive subcarriers are M consecutive available subcarriers, the quantity of subcarriers spaced between two neighboring subcarriers is a quantity of available subcarriers.

Based on this solution, when discrete subcarriers corresponding to each OFDM symbol in the first time-frequency resource block are determined from the available frequency band, N discrete subcarriers may be determined from M consecutive available subcarriers. In this case, a quantity of subcarriers spaced between two neighboring subcarriers in the N discrete subcarriers is a quantity of available subcarriers.

In an embodiment, when the M consecutive subcarriers are M consecutive physical subcarriers, the quantity of subcarriers spaced between two neighboring subcarriers is a quantity of physical subcarriers.

Based on this solution, when discrete subcarriers corresponding to each OFDM symbol in the first time-frequency resource block are determined from the available frequency band, N discrete subcarriers may be determined from M consecutive physical subcarriers. In this case, a quantity of subcarriers spaced between two neighboring subcarriers in the N discrete subcarriers is a quantity of physical subcarriers.

In an embodiment, when transmitting data on the first time-frequency resource block based on the scheduling information, the terminal device sends data on the first time-frequency resource block based on the scheduling information, or receives data on the first time-frequency resource block based on the scheduling information.

Based on this solution, the terminal device may send data on the first time-frequency resource block, or may receive data on the first time-frequency resource block. Because the first time-frequency resource block in this solution is discrete, the frequency selective characteristics of all the discrete subcarriers in the first time-frequency resource block are basically consistent with the frequency selective characteristics of all the subcarriers in the available frequency band, so that reliability of data transmission can be improved when data is received and transmitted on the first time-frequency resource block.

According to a third aspect of embodiments of this application, a data transmission apparatus is provided. The apparatus includes a processor and a transceiver. The processor is configured to allocate a first time-frequency resource block to a terminal device. The first time-frequency resource block is determined based on an available frequency band locally stored in a master device, the available frequency band includes M consecutive subcarriers, an OFDM symbol in the first time-frequency resource block includes N discrete subcarriers in frequency domain, and M is greater than N. The processor is further configured to transmit data to the terminal device on the first time-frequency resource block by using the transceiver.

In an embodiment, the processor is configured to transmit the data to the terminal device on the first time-frequency resource block based on a duplicated modulation and coding scheme by using the transceiver.

In an embodiment, the processor is configured to transmit the data to the terminal device on the first time-frequency resource block based on a robust communication mode RCM or a ROBO mode by using the transceiver.

In an embodiment, a same quantity of subcarriers are spaced between two neighboring subcarriers in the N discrete subcarriers.

In an embodiment, locations of the N discrete subcarriers are related to a quantity of divided resources and an initial subcarrier location.

In an embodiment, the quantity of divided resources is K, and the quantity of subcarriers spaced between two neighboring subcarriers is K−1.

In an embodiment, when the M consecutive subcarriers are M consecutive available subcarriers, the quantity of subcarriers spaced between two neighboring subcarriers is a quantity of available subcarriers.

In an embodiment, when the M consecutive subcarriers are M consecutive physical subcarriers, the quantity of subcarriers spaced between two neighboring subcarriers is a quantity of physical subcarriers.

In an embodiment, when transmitting data on the first time-frequency resource block based on the scheduling information includes: The terminal device sends data on the first time-frequency resource block based on the scheduling information, or receives data on the first time-frequency resource block based on the scheduling information.

According to a fourth aspect of embodiments of this application, a data transmission apparatus is provided. The apparatus includes a processor and a transceiver. The transceiver is configured to receive scheduling information from a master device, where the scheduling information includes indication information indicating a time-frequency resource location of a first time-frequency resource block corresponding to the data transmission apparatus, and the first time-frequency resource block is determined based on an available frequency band locally stored in the master device. The available frequency band includes M consecutive subcarriers, an OFDM symbol in the first time-frequency resource block includes N discrete subcarriers in frequency domain, and M is greater than N. The processor is configured to transmit data on the first time-frequency resource block based on the scheduling information by using the transceiver.

In an embodiment, the processor is configured to transmit the data on the first time-frequency resource block based on a duplicated modulation and coding scheme by using the transceiver.

In an embodiment, the processor is configured to transmit the data on the first time-frequency resource block based on a robust communication mode RCM or a ROBO mode by using the transceiver.

In an embodiment, a same quantity of subcarriers are spaced between two neighboring subcarriers in the N discrete subcarriers.

In an embodiment, locations of the N discrete subcarriers are related to a quantity of divided resources and an initial subcarrier location.

In an embodiment, the quantity of divided resources is K, and the quantity of subcarriers spaced between two neighboring subcarriers is K−1.

In an embodiment, when the M consecutive subcarriers are M consecutive available subcarriers, the quantity of subcarriers spaced between two neighboring subcarriers is a quantity of available subcarriers.

In an embodiment, when the M consecutive subcarriers are M consecutive physical subcarriers, the quantity of subcarriers spaced between two neighboring subcarriers is a quantity of physical subcarriers.

In an embodiment, the processor is configured to: send data on the first time-frequency resource block based on the scheduling information by using the transceiver, or receive data on the first time-frequency resource block based on the scheduling information by using the transceiver.

For effect descriptions of the third aspect, refer to the effect descriptions of the first aspect. For effect descriptions of the fourth aspect, refer to the effect descriptions of the second aspect. Details are not described herein again.

According to a fifth aspect of embodiments of this application, a computer-readable storage medium is provided. The computer-readable storage medium stores computer program code. When the computer program code is run on a processor, the processor is enabled to perform the method according to the first aspect or the second aspect.

According to a sixth aspect of embodiments of this application, a computer program product is provided. The program product stores computer software instructions executed by the foregoing processor, and the computer software instructions include a program used to perform the solution according to the first aspect or the second aspect.

According to a seventh aspect of embodiments of this application, a data transmission system is provided. The data transmission system includes the data transmission apparatus according to the third aspect and the data transmission apparatus according to the fourth aspect.

DESCRIPTION OF EMBODIMENTS

Figure 1:
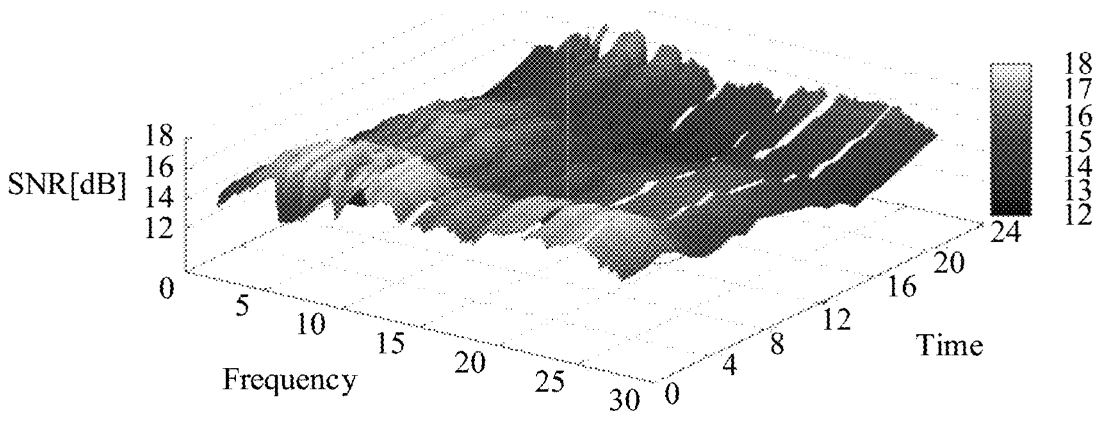
FIG. 1 is a schematic diagram of a power line communication channel response according to an embodiment of this application.

The following describes the technical solutions in embodiments of this application with reference to the accompanying drawings in embodiments of this application. In this application, "at least one" means one or more, and "a plurality of" means two or more. The term "and/or" describes an association relationship between associated objects, and represents that three relationships may exist. For example, "A and/or B" may represent the following cases: Only A exists, both A and B exist, and only B exists, where A and B may be singular or plural. The character "/" generally indicates an "or" relationship between associated objects. "At least one of the following items" or a similar expression thereof means any combination of these items, including a singular item or any combination of plural items. For example, at least one of a, b, or c may represent: a, b, c, a and b, a and c, b and c, or a, b, and c, where a, b, and c may be singular or plural. In addition, to clearly describe the technical solutions in embodiments of this application, words such as "first" and "second" are used in embodiments of this application to distinguish between same items or similar items that provide basically same functions or purposes. A person skilled in the art may understand that the words such as "first" and "second" do not limit a quantity and an execution sequence. Descriptions such as "first" and "second" appearing in embodiments of this application are merely used as examples for distinguishing between described objects and have no sequence, do not indicate a special limitation on a quantity of devices in embodiments of this application, and cannot constitute any limitation on embodiments of this application.

In embodiments of this application, unless otherwise specially stated, "transmission" (transmit/transmission) refers to bidirectional transmission, and includes a sending action and/or a receiving action. Specifically, "transmission" in embodiments of this application includes data sending, data receiving, or data sending and data receiving. In other words, data transmission herein includes uplink data transmission and/or downlink data transmission. Data may include a channel and/or a signal. The uplink data transmission is uplink channel transmission and/or uplink signal transmission, and the downlink data transmission is downlink channel transmission and/or downlink signal transmission.

It should be noted that in this application, the word such as "example" or "for example" is used to represent giving an example, an illustration, or a description. Any embodiment or design solution described as "example" or "for example" in this application should not be explained as being more preferred or having more advantages than another embodiment or design solution. Exactly, use of the word "example", "for example", or the like is intended to present a related concept in a specific manner.

In power line communication, because load impedance on a line changes in real time, an SNR between different carriers may fluctuate sharply, which affects reliability of data transmission. To improve reliability of data transmission in power line communication, data may be transmitted in an RCM mode or a ROBO mode. The RCM mode and the ROBO mode are modulation and coding schemes in different protocols. A solution of the ROBO mode in the HomePlug protocol is similar to a solution of the RCM mode in the ITU-T G.hn protocol. The following describes the solution of the RCM mode in detail.

When data is transmitted in the RCM mode, after payload bits are coded through forward error correction (FEC), a coded FEC code block is sliced, payload bits obtained after slicing are repeatedly coded, and the repeatedly coded bits are modulated onto subcarriers of a plurality of OFDM symbols according to a specific rule.

Figure 2:
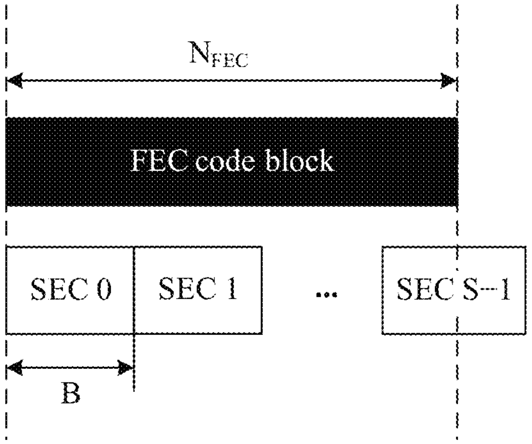
FIG. 2 is a schematic diagram of a modulation and coding scheme of an RCM mode according to an embodiment of this application.
Figure 2:
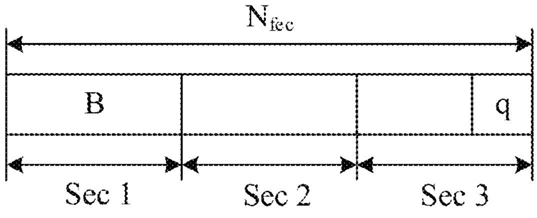
Figure 2:
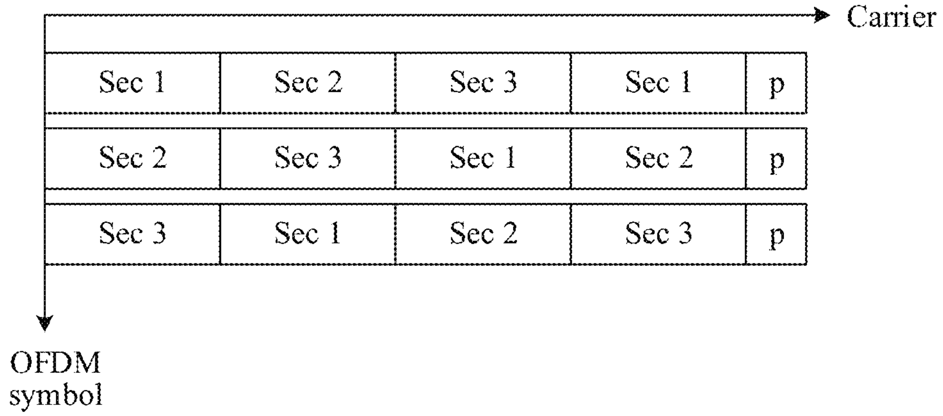

Specifically, as shown in (a) in FIG. 2, when repeated coding is performed in the RCM mode, an FEC code block may be segmented based on B bits, and is divided into S segments. B=floor(kp/$N_{rep}$), where kp is a quantity of bits carried in one OFDM, $N_{rep}$ is a quantity of repetitions in repeated coding, and "floor" represents rounding down. A quantity of segments is S=ceil($N_{FEC}$/B), where $N_{FEC}$ is a size of an FEC code block, and "ceil" represents rounding up.

For example, the quantity $N_{rep}$ of repetitions in repeated coding is 4. As shown in (b) in FIG. 2, each of the four FEC code blocks may be segmented into three segments based on B bits: a Sec 1, a Sec 2, and a Sec 3, and a data amount of each segment is B bits. With reference to (c) in FIG. 2, repeatedly coded segments are sequentially modulated onto three OFDM symbols according to a specific rule. As shown in (c) in FIG. 2, when data is transmitted in the RCM mode, because each segment covers a plurality of carrier bands, even if a segment of data fails to be transmitted due to a low SNR of some carrier bands, the segment can still be successfully transmitted in a carrier band with a high SNR. Therefore, reliability of data transmission in power line communication can be improved when data is transmitted in the RCM mode.

It should be noted that the modulation and coding scheme of the ROBO mode in the HomePlug protocol is similar to the modulation and coding scheme of the RCM mode. The modulation and coding scheme of the ROBO mode is no longer described in detail in embodiments of this application.

Figure 3:
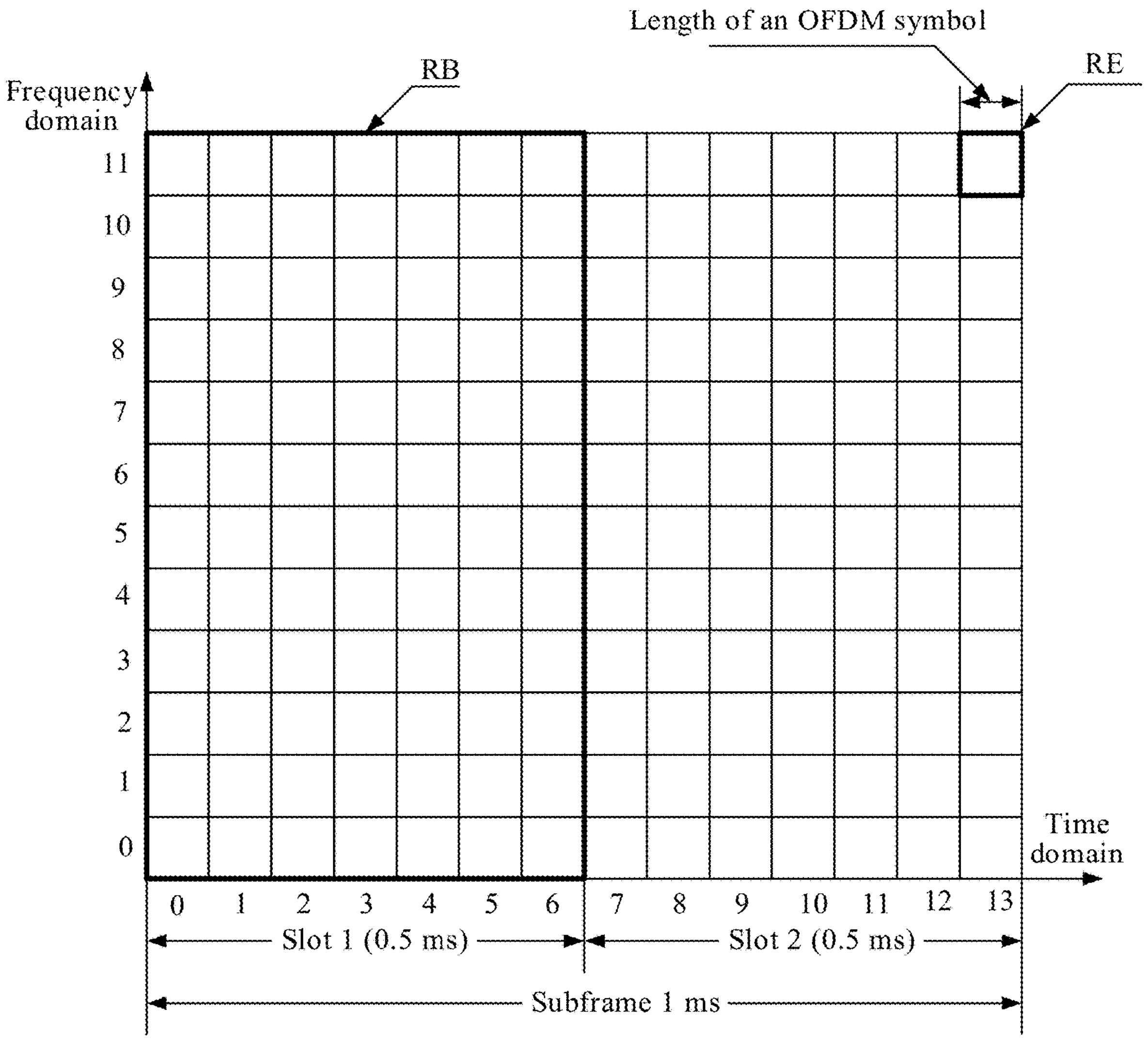
FIG. 3 is a schematic diagram of a structure of an OFDMA time-frequency resource according to an embodiment of this application.

In the field of power line communication, to implement multi-user access, the RCM mode or the ROBO mode may be combined with an OFDMA technology. FIG. 3 is a schematic diagram of a structure of an OFDMA time-frequency resource. A minimum unit in frequency domain is a subcarrier, and a minimum unit in time domain is a slot (slot). One slot is 0.5 milliseconds (ms). Each small square in a time-frequency resource grid represents a resource element (RE), and is a length of an OFDM symbol in time domain. 12 consecutive subcarriers in frequency domain and one slot in time domain form a resource block (RB). Two slots form a subframe.

Through the OFDMA technology, a time-frequency resource in OFDM modulation can be divided into several resource blocks (RBs) based on consecutive symbols and consecutive subcarriers, and then resource allocation and scheduling are performed for a plurality of users by using the RB as a granularity to implement multi-user access. To be specific, when an RB is allocated to each user based on an RB division manner in OFDMA, payload data of each user is concentrated on a small segment of consecutive subcarriers. Due to strong frequency selective fading in power line communication, the small segment of consecutive subcarriers of each user may encounter large deep fading, which reduces communication reliability of the user. Therefore, when the RCM mode or the ROBO mode is combined with the OFDMA technology, low communication reliability may be caused.

To resolve a problem that communication reliability is low when the RCM mode or the ROBO mode is combined with the OFDMA technology in power line communication, embodiments of this application provide a data transmission method. The method can be used to improve reliability of data transmission in a power line communication system.

Figure 4:
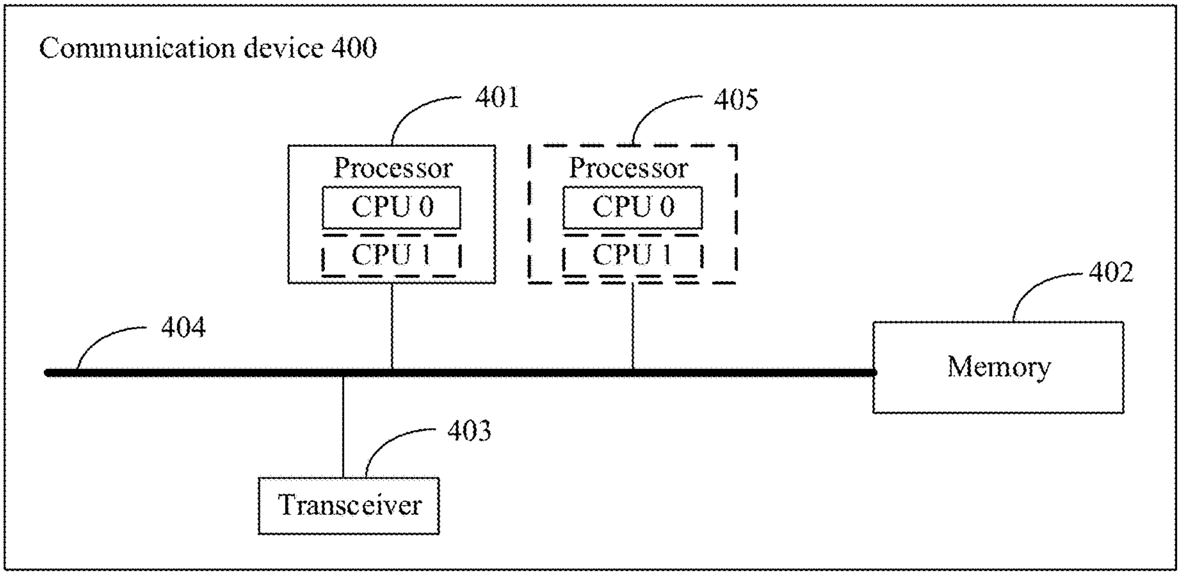
FIG. 4 is a schematic diagram of a structure of a communication device according to an embodiment of this application.

A master device and a terminal device in the data transmission method provided in embodiments of this application may be a communication device shown in FIG. 4. As shown in FIG. 4, the communication device 400 includes at least one processor 401, a memory 402, a transceiver 403, and a communication bus 404.

The following describes the components of the communication device with reference to FIG. 4.

The processor 401 is a control center of the communication device, and may be one processor or may be a general name of a plurality of processing elements. For example, the processor 401 is a central processing unit (CPU), or may be an application-specific integrated circuit (ASIC), or one or more integrated circuits configured to implement embodiments of this application, for example, one or more microprocessors (DSP) or one or more field programmable gate arrays (FPGA).

The processor 401 may execute various functions of the communication device by running or executing a software program stored in the memory 402 and invoking data stored in the memory 402.

In specific implementation, in an embodiment, the processor 401 may include one or more CPUs, for example, a CPU 0 and a CPU 1 shown in FIG. 4.

In an embodiment, the communication device may include a plurality of processors, for example, the processor 401 and a processor 405 shown in FIG. 4. Each of the processors may be a single-core processor (single-CPU), or may be a multi-core processor (multi-CPU). The processor herein may be one or more detection devices, circuits, and/or processing cores configured to process data (for example, computer program instructions).

The memory 402 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code having a form of an instruction or a data structure and that can be accessed by a computer. However, this is not limited thereto. The memory 402 may exist independently, and is connected to the processor 401 through the communication bus 404. The memory 402 may alternatively be integrated with the processor 401.

The memory 402 is configured to store a software program for performing the solutions in this application, and the processor 401 controls execution of the software program.

The transceiver 403 is configured to communicate with another communication apparatus. Certainly, the transceiver 403 may further be configured to communicate with a communication network, such as the Ethernet, a radio access network (RAN), or a wireless local area network (WLAN). The transceiver 403 may include a receiving unit for implementing a receiving function and a sending unit for implementing a sending function.

The communication bus 404 may be an industry standard architecture (ISA) bus, an external detection device interconnect (PCI) bus, an extended industry standard architecture (EISA) bus, or the like. The bus may be classified into an address bus, a data bus, a control bus, and the like. For ease of representation, only one thick line represents the bus in FIG. 4, but this does not mean that there is only one bus or only one type of bus.

The structure of the communication device shown in FIG. 4 does not constitute a limitation on the communication device. In actual application, the communication device may include more or fewer components than those shown in the figure, or combine some components, or have different component arrangements.

Figure 5:
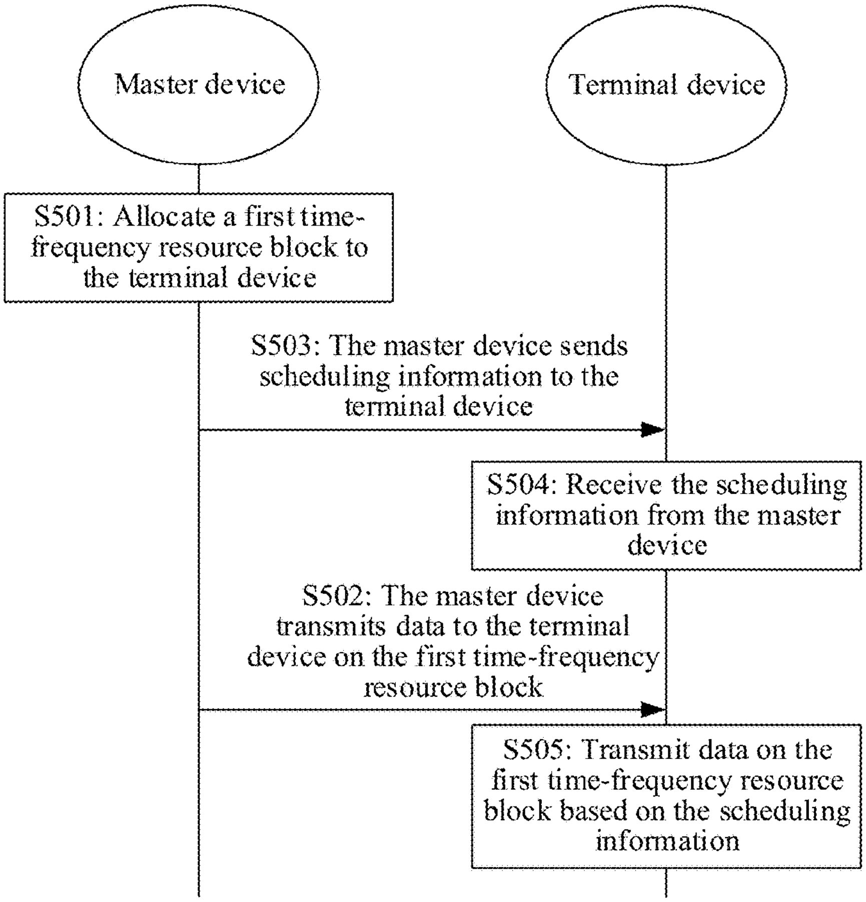
FIG. 5 is a schematic flowchart of a data transmission method according to an embodiment of this application.

With reference to FIG. 4, FIG. 5 shows a data transmission method according to an embodiment of this application. The data transmission method may be applied to the field of power line communication, or may be applied to another wired or wireless communication field. The data transmission method includes the following operations S501 to S505.

S501: A master device allocates a first time-frequency resource block to a terminal device.

The terminal device may be a to-be-scheduled device. There may be one or more terminal devices. When the master device simultaneously schedules a plurality of terminal devices, the master device allocates one first time-frequency resource block to each terminal device, and first time-frequency resource blocks allocated to different terminal devices are different.

In an embodiment, in different protocols, types of the master device and the terminal device are different. For example, in the G.hn protocol, the master device (DM) may be a base station, and the terminal device may be a terminal (end point, EP). For another example, in the HomePlug protocol, the master device may be a central coordinator (CCO), and the terminal device may be a station (STA). For another example, in the wireless fidelity (Wi-Fi) protocol, the master device may be an access point (AP) device, and the terminal device may be a station. Specific types of the master device and the terminal device are not limited in this embodiment of this application.

The first time-frequency resource block is determined based on an available frequency band locally stored in the master device, the available frequency band includes M consecutive subcarriers, an OFDM symbol in the first time-frequency resource block includes N discrete subcarriers in frequency domain, and M is greater than N. The available frequency band locally stored in the master device is a frequency band that can be used when the master device communicates with the terminal device. The available frequency band may be a frequency band specified in a protocol in power line communication, or may be a frequency band planned in each country or region. The master device may allocate a discrete first time-frequency resource block from the available frequency band to the terminal device, so that frequency selective characteristics of all subcarriers in the first time-frequency resource block are basically consistent with frequency selective characteristics of all subcarriers in the available frequency band (e.g., the entire frequency band), thereby improving reliability of data transmission in power line communication.

For example, the first time-frequency resource block may be determined from the available frequency band according to a preset rule. For example, according to the preset rule, a plurality of discrete subcarriers may be selected from a plurality of consecutive subcarriers included in the available frequency band, to obtain a plurality of subcarriers corresponding to each OFDM symbol in the first time-frequency resource block.

A specific rule for determining the first time-frequency resource block from the available frequency band is not limited in this embodiment of this application, and any rule for determining a plurality of discrete subcarriers from a plurality of consecutive subcarriers falls within the protection scope of this embodiment of this application. The following embodiment is merely an example for describing some optional implementations of determining the first time-frequency resource block from the available frequency band.

Quantities of pluralities of discrete subcarriers included in different OFDM symbols in the first time-frequency resource block in frequency domain may be the same or may be different.

For example, a symbol 1 in the first time-frequency resource block includes 200 subcarriers in frequency domain, and a symbol 2 in the first time-frequency resource block includes 210 subcarriers in frequency domain. A specific quantity of a plurality of discrete subcarriers included in each OFDM symbol in the first time-frequency resource block in frequency domain is not limited in this embodiment of this application. The following embodiment is described by using an example in which quantities of pluralities of discrete subcarriers included in different OFDM symbols in the first time-frequency resource block in frequency domain are the same.

In the N discrete subcarriers included in the OFDM symbol in the first time-frequency resource block in frequency domain, quantities of subcarriers spaced between two neighboring subcarriers may be the same or may be different. To be specific, the first time-frequency resource block may be obtained through even comb-shaped division in the M consecutive subcarriers in the available frequency band, or the first time-frequency resource block may be obtained through uneven comb-shaped division in the M consecutive subcarriers in the available frequency band.

The first time-frequency resource block may include a plurality of OFDM symbols, and a plurality of discrete subcarriers included in each OFDM symbol in frequency domain all are determined based on the available frequency band. A quantity of OFDM symbols included in the first time-frequency resource block is not limited in this embodiment of this application. When the first time-frequency resource block includes a plurality of OFDM symbols, different comb-shaped division manners may be used for N discrete subcarriers included in different OFDM symbols in the first time-frequency resource block in frequency domain. For example, a same quantity of subcarriers are spaced between two neighboring subcarriers in N discrete subcarriers included in one OFDM symbol in the first time-frequency resource block in frequency domain, and different quantities of subcarriers are spaced between two neighboring subcarriers in N discrete subcarriers included in another OFDM symbol in frequency domain.

In an embodiment of this application, a specific implementation of determining the first time-frequency resource block from the available frequency band and a specific discrete manner of the N discrete subcarriers in the first time-frequency resource block are not limited, and any implementation of determining the N discrete subcarriers from the M consecutive subcarriers falls within the protection scope of this embodiment of this application. The following embodiment is described by using an example in which a same quantity of subcarriers are spaced between two neighboring subcarriers in the N discrete subcarriers included in each OFDM symbol in the first time-frequency resource block in frequency domain.

In an embodiment, locations of a plurality of discrete subcarriers included in each OFDM symbol in the first time-frequency resource block in frequency domain are related to a quantity of divided resources and an initial subcarrier location. Initial subcarrier locations of different OFDM symbols in the first time-frequency resource block may be the same or may be different. For example, the first time-frequency resource block includes an OFDM symbol 1 and an OFDM symbol 2. An initial subcarrier location of the OFDM symbol 1 in the first time-frequency resource block is a subcarrier 0, and the OFDM symbol 1 includes the subcarrier 0, a subcarrier 2, a subcarrier 4, a subcarrier 6, a subcarrier 8, and the like in frequency domain. An initial subcarrier location of the OFDM symbol 2 in the first time-frequency resource block is a subcarrier 1, and the OFDM symbol 2 includes the subcarrier 1, a subcarrier 3, a subcarrier 5, a subcarrier 7, a subcarrier 9, and the like in frequency domain. In other words, the initial subcarrier locations of the OFDM symbol 1 and the OFDM symbol 2 in the first time-frequency resource block may be different.

The following embodiment is described by using an example in which initial subcarrier locations of different OFDM symbols in the first time-frequency resource block are the same. The quantity of divided resources may be 2, 4, 6, 8, or another quantity. A specific value of the quantity of divided resources is not limited in this embodiment of this application. The following embodiment is described by using an example in which the quantity of divided resources is 2 or 4.

Figure 6:
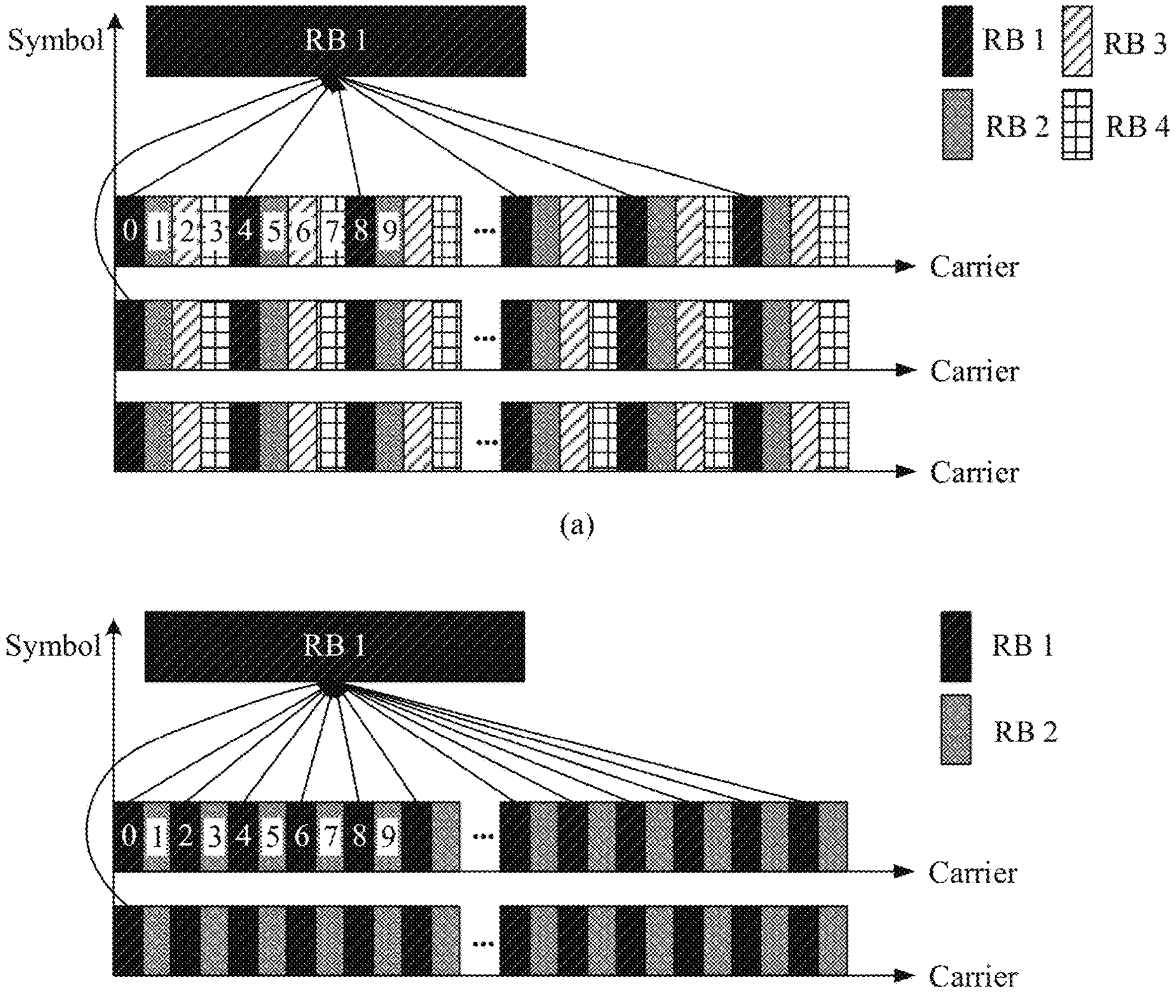
FIG. 6 is a schematic diagram of a structure of a type of resource division according to an embodiment of this application.

For example, as shown in (a) in FIG. 6, the quantity of divided resources is 4 and the available frequency band includes 1000 consecutive subcarriers, which are respectively a subcarrier 0 to a subcarrier 999. When the quantity of divided resources is 4, according to a preset rule, a subcarrier 0, a subcarrier 4, a subcarrier 8, a subcarrier 12, a subcarrier 16, . . . , and a subcarrier 996 in each OFDM symbol may be grouped into a resource block RB 1, where an initial subcarrier location of the resource block RB 1 is the subcarrier 0, and each OFDM in the resource block RB 1 includes 250 discrete subcarriers in frequency domain; a subcarrier 1, a subcarrier 5, a subcarrier 9, a subcarrier 13, a subcarrier 17, . . . , and a subcarrier 997 in each OFDM symbol may be grouped into a resource block RB 2, where an initial subcarrier location of the resource block RB 2 is the subcarrier 1, and each OFDM in the resource block RB 2 includes 250 discrete subcarriers in frequency domain; a subcarrier 2, a subcarrier 6, a subcarrier 10, a subcarrier 14, a subcarrier 18, . . . , and a subcarrier 998 in each OFDM symbol may be grouped into a resource block RB 3, where an initial subcarrier location of the resource block RB 3 is the subcarrier 2, and each OFDM in the resource block RB 3 includes 250 discrete subcarriers in frequency domain; and a subcarrier 3, a subcarrier 7, a subcarrier 11, a subcarrier 15, a subcarrier 19, . . . , and a subcarrier 999 in each OFDM symbol may be grouped into a resource block RB 4, where an initial subcarrier location of the resource block RB 4 is the subcarrier 3, and each OFDM in the resource block RB 4 includes 250 discrete subcarriers in frequency domain.

For example, as shown in (b) in FIG. 6, the quantity of divided resources is 2 and the available frequency band includes 1000 consecutive subcarriers, which are respectively a subcarrier 0 to a subcarrier 999. When the quantity of divided resources is 2, according to a preset rule, a subcarrier 0, a subcarrier 2, a subcarrier 4, a subcarrier 6, a subcarrier 8, . . . , and a subcarrier 998 in each OFDM symbol may be grouped into a resource block RB 1, where an initial subcarrier location of the resource block RB 1 is the subcarrier 0, and each OFDM in the resource block RB 1 includes 500 discrete subcarriers in frequency domain; and a subcarrier 1, a subcarrier 3, a subcarrier 5, a subcarrier 7, a subcarrier 9, . . . , and a subcarrier 999 in each OFDM symbol may be grouped into a resource block RB 2, where an initial subcarrier location of the resource block RB 2 is the subcarrier 1, and each OFDM in the resource block RB 2 includes 500 discrete subcarriers in frequency domain.

In an embodiment of this application, the first time-frequency resource block may be determined from the available frequency band according to a preset rule. The preset rule may be specified in a protocol. For example, the protocol specifies specific time-frequency resource information of two first time-frequency resource blocks obtained by dividing the available frequency band when the quantity of divided resources is 2, and subcarriers included in each OFDM symbol in each first time-frequency resource block in frequency domain are discrete.

For example, when a same quantity of subcarriers are spaced between two neighboring subcarriers in the N discrete subcarriers included in the OFDM symbol in the first time-frequency resource block in frequency domain, the quantity of subcarriers spaced between two neighboring subcarriers is related to the quantity of divided resources. When the quantity of divided resources is K, the quantity of subcarriers spaced between two neighboring subcarriers is K−1.

For example, as shown in (a) in FIG. 6, when the quantity of divided resources is 4, each OFDM symbol in the resource block RB 1 includes 250 discrete subcarriers in frequency domain, and a quantity of subcarriers spaced between two neighboring subcarriers in the 250 discrete subcarriers is 3. For example, three subcarriers are spaced between the subcarrier 0 and the subcarrier 4, which are respectively the subcarrier 1 to the subcarrier 3. For another example, three subcarriers are also spaced between the subcarrier 4 and the subcarrier 8, which are respectively the subcarrier 5 to the subcarrier 7.

For another example, as shown in (b) in FIG. 6, when the quantity of divided resources is 2, each OFDM symbol in the resource block RB 1 includes 500 discrete subcarriers in frequency domain, and a quantity of subcarriers spaced between two neighboring subcarriers in the 500 discrete subcarriers is 1. For example, one subcarrier 1 is spaced between the subcarrier 0 and the subcarrier 2, one subcarrier 3 is spaced between the subcarrier 2 and the subcarrier 4, and so on.

It may be understood that in this embodiment of this application, when the available frequency band is divided into a plurality of first time-frequency resource blocks, division may be performed in a comb-shaped division manner, so that frequency selective characteristics of all subcarriers in each first time-frequency resource block are basically consistent with the frequency selective characteristics of all the subcarriers in the available frequency band.

In an embodiment, to ensure that some frequency bands can be used for an emergency service, some subcarriers in the available frequency band may be required to be avoided. Such avoidance includes static avoidance and dynamic avoidance. During static avoidance, some subcarriers may be directly disabled. During dynamic avoidance, an available subcarrier in the available frequency band may dynamically change. In other words, some carrier bands in the available frequency band may be required to be avoided. Therefore, the M consecutive subcarriers included in the available frequency band may be M consecutive available subcarriers, or may be M consecutive physical subcarriers.

In an embodiment, when the M consecutive subcarriers are M consecutive physical subcarriers, the quantity of subcarriers spaced between two neighboring subcarriers in the N discrete subcarriers is a quantity of physical subcarriers. In this implementation, a quantity of subcarriers included in the available frequency band is M. When some subcarriers are required to be avoided, the M consecutive subcarriers include both available subcarriers and unavailable subcarriers (for example, subcarriers that are required to be avoided). According to a preset rule, regardless of whether each of the M consecutive subcarriers is available, the N discrete subcarriers may be determined from the M physical subcarriers in a comb-shaped division manner.

Figure 7:
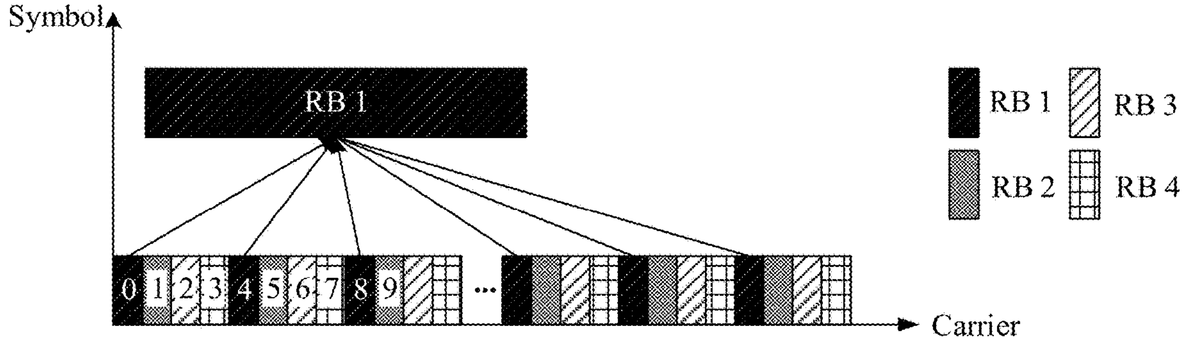
FIG. 7 is a schematic diagram of a structure of another type of resource division according to an embodiment of this application.
Figure 7:
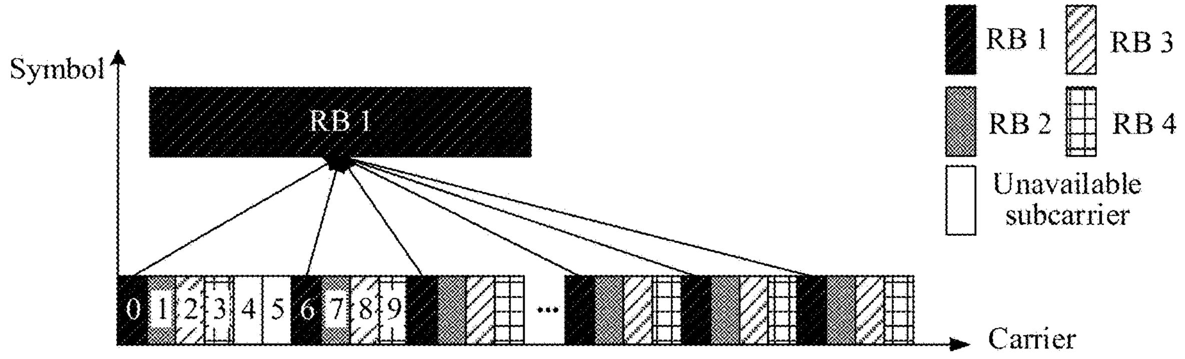

For example, as shown in (a) in FIG. 7, the quantity of divided resources is 4 and the available frequency band includes 1000 subcarriers. Some of the 1000 subcarriers may be unavailable. Regardless of whether each of the 1000 subcarriers is available, a subcarrier 0, a subcarrier 4, a subcarrier 8, a subcarrier 12, a subcarrier 16, . . . , and a subcarrier 996 in each OFDM symbol are directly grouped into a resource block RB 1; a subcarrier 1, a subcarrier 5, a subcarrier 9, a subcarrier 13, a subcarrier 17, . . . , and a subcarrier 997 in each OFDM symbol are directly grouped into a resource block RB 2; a subcarrier 2, a subcarrier 6, a subcarrier 10, a subcarrier 14, a subcarrier 18, . . . , and a subcarrier 998 in each OFDM symbol are directly grouped into a resource block RB 3; and a subcarrier 3, a subcarrier 7, a subcarrier 11, a subcarrier 15, a subcarrier 19, . . . , and a subcarrier 999 in each OFDM symbol are directly grouped into a resource block RB 4. Each OFDM symbol in each of the foregoing resource blocks includes 250 discrete subcarriers, and a quantity of subcarriers spaced between two neighboring subcarriers in the 250 discrete subcarriers is 3. In other words, three physical subcarriers are spaced between two neighboring subcarriers in the 250 discrete subcarriers.

In an embodiment, when the M consecutive subcarriers are M consecutive available subcarriers, the quantity of subcarriers spaced between two neighboring subcarriers in the N discrete subcarriers is a quantity of available subcarriers. In this implementation, the available frequency band may include K subcarriers, where K is greater than or equal to M. K subcarriers corresponding to each OFDM symbol include M available subcarriers and (K−M) unavailable subcarriers (for example, subcarriers that are required to be avoided). The N discrete subcarriers may be determined from the M available subcarriers according to a preset rule.

For example, as shown in (b) in FIG. 7, the quantity of divided resources is 4, the available frequency band includes 1000 subcarriers, and a subcarrier 4 and a subcarrier 5 in the 1000 subcarriers are unavailable. Because the subcarrier 4 and the subcarrier 5 are unavailable, a subcarrier 0, a subcarrier 6, a subcarrier 10, a subcarrier 14, and the like may be grouped into a resource block RB 1; a subcarrier 1, a subcarrier 7, a subcarrier 11, a subcarrier 15, a subcarrier 19, and the like may be grouped into a resource block RB 2; a subcarrier 2, a subcarrier 8, a subcarrier 12, a subcarrier 16, a subcarrier 20, and the like may be grouped into a resource block RB 3; and a subcarrier 3, a subcarrier 9, a subcarrier 13, a subcarrier 17, a subcarrier 21, and the like may be grouped into a resource block RB 4. Each OFDM symbol in each of the foregoing resource blocks includes 250 or 249 subcarriers, and three available subcarriers are spaced between two neighboring subcarriers in the 250 or 249 discrete subcarriers.

For example, when allocating the first time-frequency resource block to the terminal device, the master device may allocate the first time-frequency resource block to the terminal device based on parameters such as a quantity of to-be-scheduled terminal devices, an amount of to-be-transmitted data, and a transmission rate of the terminal device. The quantity of to-be-scheduled terminal devices may be the same as or different from the quantity of divided resources.

For example, there are three to-be-scheduled terminal devices: a terminal device 1 to a terminal device 3. The master device may allocate, in the resource block division manner shown in (a) in FIG. 6, the resource block RB 1 shown in (a) in FIG. 6 to the terminal device 1, the resource block RB 2 shown in (a) in FIG. 6 to the terminal device 2, and the resource block RB 3 shown in (a) in FIG. 6 to the terminal device 3.

For another example, there are three to-be-scheduled terminal devices: a terminal device 1 to a terminal device 3. The master device may alternatively allocate, in the resource block division manner shown in (a) in FIG. 6, the resource blocks RB 1 and RB 2 shown in (a) in FIG. 6 to the terminal device 1, the resource block RB 3 shown in (a) in FIG. 6 to the terminal device 2, and the resource block RB 4 shown in (a) in FIG. 6 to the terminal device 3.

For another example, there are two to-be-scheduled terminal devices: a terminal device 1 and a terminal device 2. The master device may respectively allocate, in the resource block division manner shown in (b) in FIG. 6, the resource block RB 1 shown in (b) in FIG. 6 and the resource block RB 2 shown in (b) in FIG. 6 to the terminal device 1 and the terminal device 2. The master device may allocate the resource block RB 1 shown in (b) in FIG. 6 to the terminal device 1, and allocate the resource block RB 2 shown in (b) in FIG. 6 to the terminal device 2; or the master device may allocate the resource block RB 2 shown in (b) in FIG. 6 to the terminal device 1, and allocate the resource block RB 1 shown in (b) in FIG. 6 to the terminal device 2. Because the resource block RB 1 and the resource block RB 2 shown in (b) in FIG. 6 are obtained through comb-shaped division, frequency selective characteristics of all subcarriers in each resource block are basically consistent with the frequency selective characteristics of all the subcarriers in the available frequency band. There is basically no difference between allocating, by the master device, the resource block RB 1 to the terminal device 1 and allocating, by the master device, the resource block RB 2 to the terminal device 1.

A specific implementation of allocating, by the master device, the first time-frequency resource block to the terminal device is not limited in this embodiment of this application. It should be noted that, subcarriers in the first time-frequency resource block allocated by the master device to the terminal device are discrete, and the frequency selective characteristics of all the subcarriers in the first time-frequency resource block are basically consistent with the frequency selective characteristics of all the subcarriers in the available frequency band.

S502: The master device transmits data to the terminal device on the first time-frequency resource block.

When there are a plurality of terminal devices, the master device may transmit data to each terminal device on the first time-frequency resource block corresponding to the terminal device. For example, scheduled terminal devices include a terminal device 1 and a terminal device 2. The master device allocates the resource block RB 1 shown in (b) in FIG. 6 to the terminal device 1, and allocates the resource block RB 2 shown in (b) in FIG. 6 to the terminal device 2. The master device may transmit data to the terminal device 1 on the RB 1 corresponding to the terminal device 1, and transmit data to the terminal device 2 on the RB 2 corresponding to the terminal device 2.

Operation S502 may include: The master device transmits the data to the terminal device on the first time-frequency resource block based on a duplicated modulation and coding scheme. For example, the master device first duplicates transmitted data bits, modulates the repeated data bits onto different carrier locations in the first time-frequency resource block according to a specific rule, and transmits the repeated data bits to the terminal device on the first time-frequency resource block, so as to obtain a coding gain of duplication.

For example, the duplicated modulation and coding scheme is an RCM or a ROBO mode. Operation S502 may include: The master device transmits the data to the terminal device on the first time-frequency resource block based on the RCM mode or the ROBO mode. Specifically, when data is transmitted in the RCM mode or the ROBO mode, after FEC coding is performed on the data, a coded FEC code block may be repeatedly coded, and repeatedly coded bits are modulated onto subcarriers of a plurality of OFDM symbols according to a specific rule.

When the first time-frequency resource block is obtained through division by using the foregoing comb-shaped resource block solution, a quantity kp of bits carried in one OFDM becomes 1/k of an entire frequency band (for example, the available frequency band), where k is the quantity of divided resources. For example, each OFDM symbol includes 1000 subcarriers in an entire frequency band in frequency domain. If the quantity of divided resources is 4, each OFDM symbol in each first time-frequency resource block includes about 250 discrete subcarriers in frequency domain. For another example, each OFDM symbol includes 1000 subcarriers in an entire frequency band in frequency domain. If the quantity of divided resources is 2, each OFDM symbol in each first time-frequency resource block includes about 500 discrete subcarriers in frequency domain. In other words, a larger quantity of divided resources indicates a smaller quantity kp of bits carried in one OFDM.

When repeated coding is performed in the RCM mode or the ROBO mode, an FEC code block may be segmented based on B bits, and is divided into S segments. B=floor($kp/N_{rep}$), and a quantity of segments is S=ceil($N_{FEC}/B$). Compared with that the RCM mode or ROBO mode is used for the entire frequency band, in a case of a same quantity $N_{rep}$ of repetitions, because kp becomes 1/k of the entire frequency band, a quantity B of bits of a single segment decreases correspondingly, and the quantity S of segments increases correspondingly.

In an embodiment, when the repeatedly coded bits are modulated onto subcarriers of a plurality of OFDM symbols, the repeatedly coded bits may be modulated onto subcarriers of S OFDM symbols. In other words, a quantity of OFDM symbols may be the same as the quantity of segments. Certainly, the quantity of OFDM symbols may be different from the quantity of segments, and the quantity of OFDM symbols is related to a modulation rule of RCM. The following uses an example in which the quantity of OFDM symbols is the same as the quantity of segments for description.

For example, the quantity of divided resources is 2, and the quantity $N_{rep}$ of repetitions in repeated coding is 4. As shown in (a) in FIG. 8, each FEC code block may be segmented into six segments based on B bits: a Sec 1 to a Sec 6 respectively, and a data amount of each segment is B bits. As shown in (b) in FIG. 8, repeatedly coded segments are sequentially modulated onto six OFDM symbols according to a specific rule. Compared with the modulation scheme, shown in (c) in FIG. 2, in which the RCM mode is used in the entire frequency band, when an OFDMA technology is combined with the modulation scheme of the RCM mode, because the quantity kp of bits carried in one OFDM becomes ¼ of the entire frequency band, the quantity S of segments in the modulation scheme shown in (b) in FIG. 8 is twice the quantity of segments in the modulation scheme shown in (c) in FIG. 2, and a quantity of bits of each segment in the modulation scheme shown in (b) in FIG. 8 is smaller than a quantity of bits of each segment in the modulation scheme shown in (c) in FIG. 2.

Figure 8:
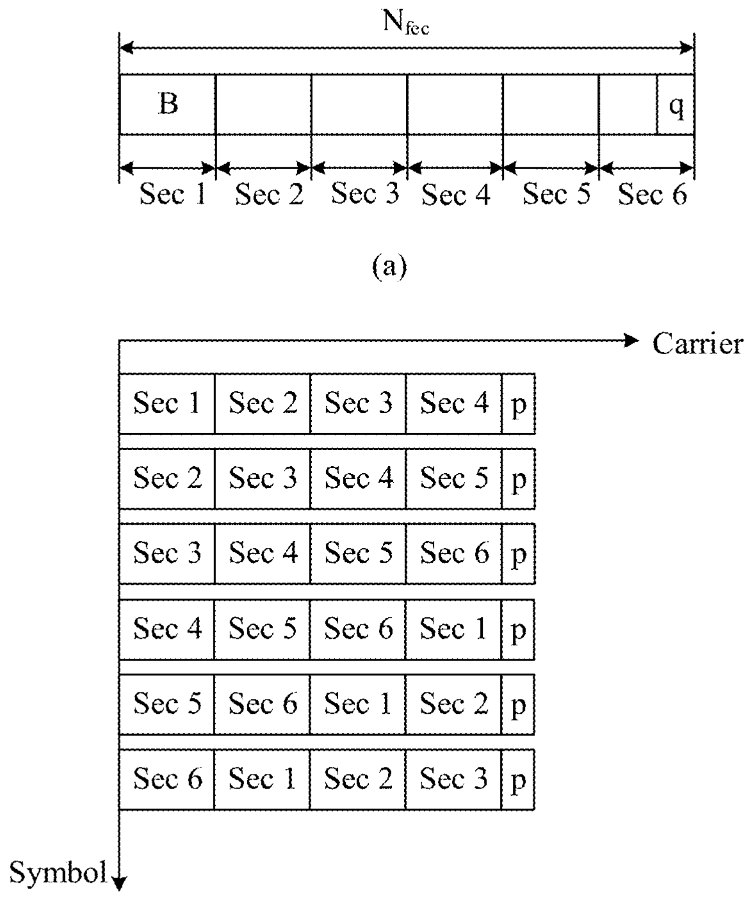
FIG. 8 is a schematic diagram of another modulation and coding scheme of an RCM mode according to an embodiment of this application.
Figure 9:
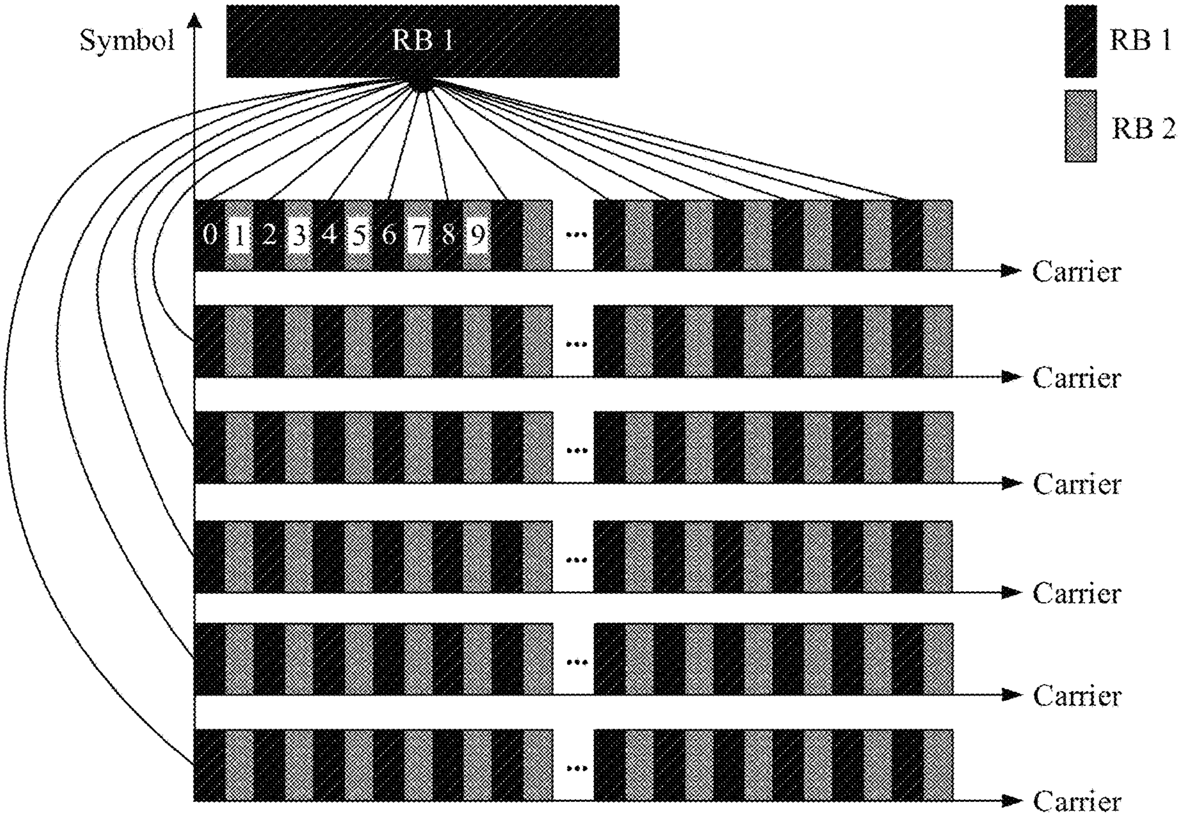
FIG. 9 is a schematic diagram of a structure of still another type of resource division according to an embodiment of this application.

With reference to FIG. 8 and FIG. 9, when the OFDMA technology is combined with the modulation scheme of the RCM mode, an example in which the quantity of divided resources is 2, the first time-frequency resource block is a resource block RB 1 in FIG. 9, and the available frequency band includes 1000 subcarriers is used. Each segment Sec shown in (b) in FIG. 8 may be transmitted by using a time-frequency resource of the RB 1 shown in FIG. 9. For example, each OFDM symbol in the RB 1 corresponds to 500 discrete subcarriers, the 500 discrete subcarriers may be divided into four carrier bands, and each carrier band includes 125 discrete subcarriers. Four carrier bands corresponding to a first OFDM symbol respectively transmit a Sec 1, a Sec 2, a Sec 3, and a Sec 4, four carrier bands corresponding to a second OFDM symbol respectively transmit the Sec 2, the Sec 3, the Sec 4, and a Sec 5, four carrier bands corresponding to a third OFDM symbol respectively transmit the Sec 3, the Sec 4, the Sec 5, and a Sec 6, four carrier bands corresponding to a fourth OFDM symbol respectively transmit the Sec 4, the Sec 5, the Sec 6, and the Sec 1, four carrier bands corresponding to a fifth OFDM symbol respectively transmit the Sec 5, the Sec 6, the Sec 1, and the Sec 2, and four carrier bands corresponding to a sixth OFDM symbol respectively transmit the Sec 6, the Sec 1, the Sec 2, and the Sec 3. Because frequency selective characteristics of all subcarriers (e.g., 500 subcarriers) in the RB 1 are basically consistent with those of all the subcarriers (e.g., 1000 subcarriers) in the available frequency band, when a segment of data fails to be transmitted in a carrier band with a low SNR, the segment of data can still be successfully transmitted in a carrier band with a high SNR, thereby improving transmission reliability of each segment of data.

It may be understood that, when data is transmitted to the terminal device on the first time-frequency resource block in the robust communication mode RCM or the ROBO mode, because the subcarriers in the first time-frequency resource block are discrete, the frequency selective characteristics of all the subcarriers in the first time-frequency resource block are basically consistent with the frequency selective characteristics of all the subcarriers in the available frequency band. Therefore, when the OFDMA technology is combined with the RCM or ROBO mode, because each segment of data can cover a plurality of carrier bands on the first time-frequency resource block, and the frequency selective characteristics of all the subcarriers in the first time-frequency resource block are basically consistent with the frequency selective characteristics of all the subcarriers in the available frequency band, even if a segment of data fails to be transmitted due to low SNRs of some carrier bands, the segment can still be successfully transmitted in a carrier band with a high SNR. Therefore, reliability of data transmission in power line communication can be improved by using the robust communication mode RCM or the ROBO mode on the first time-frequency resource block.

In an embodiment, when transmitting data to the terminal device on the first time-frequency resource block, the master device sends data to the terminal device on the first time-frequency resource block, or the master device receives data from the terminal device on the first time-frequency resource block. When the master device sends data to the terminal device on the first time-frequency resource block, the master device may send the data to the terminal device in the RCM or ROBO mode. When the master device receives data from the terminal device on the first time-frequency resource block, the master device may demodulate and decode data of different users in different time-frequency resources, and then allocate demodulated and decoded data to a corresponding queue for forwarding.

In an embodiment, before transmitting the data to the terminal device, the master device may first send scheduling information to the terminal device. In other words, before operation S502, operation S503 may be included.

S503: The master device sends the scheduling information to the terminal device.

The scheduling information includes indication information, and the indication information indicates a time-frequency resource location of the first time-frequency resource block corresponding to the terminal device.

For example, the master device allocates one time-frequency resource block to each to-be-scheduled terminal device based on parameters such as a quantity of to-be-scheduled terminal devices, an amount of to-be-transmitted data, and a transmission rate of the terminal device. Each OFDM symbol in each time-frequency resource block includes N discrete subcarriers in frequency domain. Before sending data to the terminal device, the master device may send the scheduling information to each terminal device. The scheduling information includes an index, and the index is used to indicate time-frequency resource information of the time-frequency resource block corresponding to the terminal device.

For example, there are two to-be-scheduled terminal devices: a terminal device 1 and a terminal device 2. If the master device allocates the resource block RB 1 shown in (b) in FIG. 6 to the terminal device 1, and allocates the resource block RB 2 shown in (b) in FIG. 6 to the terminal device 2, the master device sends scheduling information 1 to the terminal device 1, where an index in the scheduling information 1 indicates a time-frequency resource of the resource block RB 1 allocated by the master device to the terminal device 1, for example, the index in the scheduling information 1 indicates that the time-frequency resource of the RB 1 includes the subcarrier 0, the subcarrier 2, the subcarrier 4, the subcarrier 6, . . . , and the subcarrier 998; and the master device sends scheduling information 2 to the terminal device 2, where an index in the scheduling information 2 indicates a time-frequency resource of the resource block RB 2 allocated by the master device to the terminal device 2, for example, the index in the scheduling information 2 indicates that the time-frequency resource of the RB 2 includes the subcarrier 1, the subcarrier 3, the subcarrier 5, the subcarrier 7, . . . , and the subcarrier 999.

S504: The terminal device receives the scheduling information from the master device.

After receiving the scheduling information, the terminal device may learn of time-frequency resource information of the first time-frequency resource block allocated by the master device to the terminal device.

S505: The terminal device transmits data on the first time-frequency resource block based on the scheduling information.

The terminal device may transmit data on the first time-frequency resource block allocated by the master device to the terminal device. Optionally, the terminal device may transmit data to the master device on the first time-frequency resource block allocated by the master device to the terminal device, or may transmit data to another terminal device on the first time-frequency resource block allocated by the master device to the terminal device.

In operation S505, the terminal device transmits the data on the first time-frequency resource block based on a duplicated modulation and coding scheme. For example, the terminal device first duplicates transmitted data bits, modulates the repeated data bits onto different carrier locations in the first time-frequency resource block according to a specific rule, and transmits the repeated data bits on the first time-frequency resource block.

For example, the duplicated modulation and coding scheme is the RCM mode or the ROBO mode. In operation S505, the terminal device transmits the data on the first time-frequency resource block based on the RCM mode or the ROBO mode. Specifically, when the terminal device transmits data on the first time-frequency resource block in the RCM mode or the ROBO mode, after FEC coding is performed on the data, the terminal device may repeatedly code a coded FEC code block, and modulate repeatedly coded bits onto subcarriers of a plurality of OFDM symbols in the first time-frequency resource block according to a specific rule. For a specific implementation in which the terminal device transmits the data on the first time-frequency resource block in the robust communication mode RCM or the ROBO mode, refer to the related descriptions in operation S502. Details are not described herein again.

For example, that the terminal device transmits data on the first time-frequency resource block includes: The terminal device sends data on the first time-frequency resource block, or the terminal device receives data on the first time-frequency resource block. When the terminal device sends data to the master device or another terminal device on the first time-frequency resource block, the terminal device may send the data in the RCM or ROBO mode. When the terminal device receives data on the first time-frequency resource block, the master device may obtain data information of the master device through demodulation based on the scheduling information.

It should be noted that, in this embodiment of this application, a sequence of performing operation S502 and operations S504 and S505 is not limited. FIG. 5 is merely an example. For example, operation S502 and operation S504 may be performed simultaneously, operation S502 may be performed before operations S504 and S505, or operation S502 may be performed after operations S504 and S505.

According to the data transmission method provided in this embodiment of this application, the first time-frequency resource block is obtained by grouping consecutive time-frequency resources into a comb-shaped resource block according to a preset rule, so that the subcarriers in the first time-frequency resource block are discrete, and the frequency selective characteristics of all the discrete subcarriers in the first time-frequency resource block are basically consistent with the frequency selective characteristics of all the subcarriers in the available frequency band. Therefore, reliability of data transmission can be improved when data is transmitted on the first time-frequency resource block. In addition, data is repeatedly coded through RCM or ROBO and modulated onto a plurality of OFDM symbols, so that reliability of data transmission can be further improved.

The solutions provided in embodiments of the present invention are described above from a perspective of a method operation. It may be understood that, to implement the foregoing functions, a computer includes corresponding hardware structures and/or software modules for performing the functions. A person skilled in the art should be easily aware that, the units and the algorithm operations in the examples described with reference to embodiments disclosed in this specification can be implemented in this application by a combination of hardware and computer software. A skilled perform may use different methods to implement the described functions for each particular application, but this implementation should not be considered as beyond the scope of the present invention.

In embodiments of this application, the computer may be divided into functional modules based on the foregoing method example. For example, each functional module may be obtained through division for each corresponding function, or two or more functions may be integrated into one processing module. The integrated module may be implemented in a form of hardware, or may be implemented in a form of a software functional module. It should be noted that in embodiments of the present invention, module division is an example, and is merely logical function division. In actual implementation, there may be another division manner.

Figure 10:
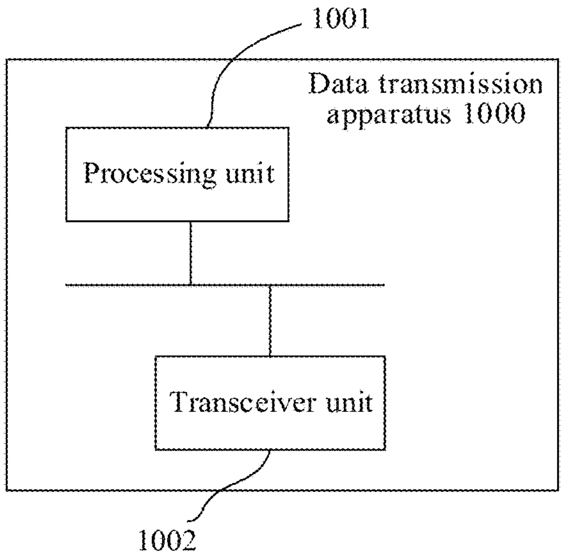
FIG. 10 is a schematic diagram of composition of a data transmission apparatus according to an embodiment of this application.

FIG. 10 is a schematic diagram of a structure of a data transmission apparatus 1000. The data transmission apparatus may be the master device in the foregoing embodiments, or may be a chip in a master device. The data transmission apparatus 1000 may be configured to implement the data transmission method in any one of the foregoing embodiments.

The data transmission apparatus 1000 includes a processing unit 1001 and a transceiver unit 1002. For example, the transceiver unit 1002 is configured to support the data transmission apparatus 1000 in receiving and sending information, or is configured to communicate with another device. The processing unit 1001 is configured to control and manage an action of the data transmission apparatus 1000, and is configured to perform processing performed by the data transmission apparatus 1000 in the foregoing embodiments. Optionally, if the data transmission apparatus 1000 includes a storage unit, the processing unit 1001 may further execute a program or instructions stored in a memory, so that the data transmission apparatus 1000 implements the method and the function in any one of the foregoing embodiments.

For example, the processing unit 1001 may be configured to perform, for example, operation S501 in FIG. 5, and/or another process of the technology described in this specification. The transceiver unit 1002 may be configured to perform, for example, operations S502 and S503 in FIG. 5, and/or another process of the technology described in this specification. All related content of the operations in the foregoing method embodiments may be cited in function descriptions of the corresponding functional modules. Details are not described herein again.

For example, in terms of hardware implementation, a processor may perform the function of the processing unit 1001, and a transceiver (transmitter/receiver) and/or a communication interface may perform the function of the transceiver unit 1002. The processing unit 1001 may be embedded in or independent of a processor of the data transmission apparatus 1000 in a hardware form, or may be stored in a memory of the data transmission apparatus 1000 in a software form, so that the processor invokes and performs operations corresponding to the foregoing functional units.

When the processing unit 1001 is a processor and the transceiver unit 1002 is a transceiver, a specific structure of the data transmission apparatus shown in FIG. 10 may be the communication device shown in FIG. 4. Descriptions of all related content of the components in FIG. 4 may be cited in function descriptions of the corresponding components in FIG. 10. Details are not described herein again.

Figure 11:
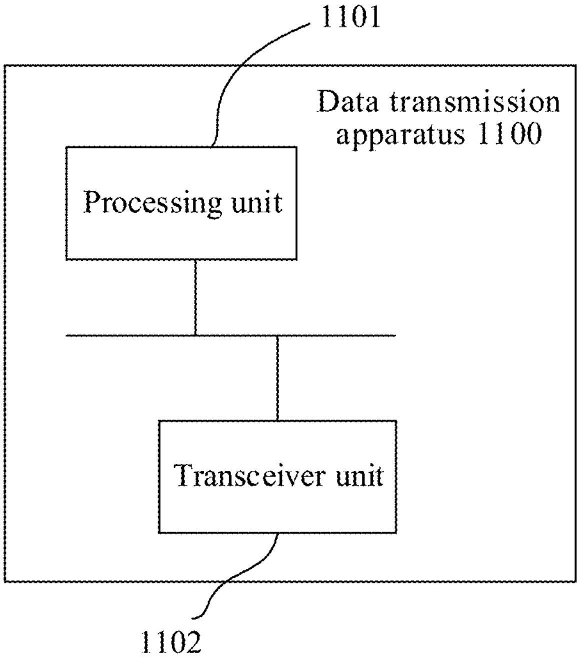
FIG. 11 is a schematic diagram of composition of another data transmission apparatus according to an embodiment of this application.

FIG. 11 is a schematic diagram of a structure of a data transmission apparatus 1100. The data transmission apparatus may be the terminal device in the foregoing embodiments, or may be a chip in a terminal device. The data transmission apparatus 1100 may be configured to implement the data transmission method in any one of the foregoing embodiments.

The data transmission apparatus 1100 includes a processing unit 1101 and a transceiver unit 1102. For example, the transceiver unit 1102 is configured to support the data transmission apparatus 1100 in receiving and sending information, or is configured to communicate with another device. The processing unit 1101 is configured to control and manage an action of the data transmission apparatus 1100, and is configured to perform processing performed by the data transmission apparatus 1100 in the foregoing embodiments. Optionally, if the data transmission apparatus 1100 includes a storage unit, the processing unit 1101 may further execute a program or instructions stored in a memory, so that the data transmission apparatus 1100 implements the method and the function in any one of the foregoing embodiments.

For example, the processing unit 1101 may be configured to perform, by using the transceiver unit 1102, operations S504 and S505 in FIG. 5, and/or another process of the technology described in this specification. All related content of the operations in the foregoing method embodiments may be cited in function descriptions of the corresponding functional modules. Details are not described herein again.

For example, in terms of hardware implementation, a processor may perform the function of the processing unit 1101, and a transceiver (transmitter/receiver) and/or a communication interface may perform the function of the transceiver unit 1102. The processing unit 1101 may be embedded in or independent of a processor of the data transmission apparatus 1100 in a hardware form, or may be stored in a memory of the data transmission apparatus 1100 in a software form, so that the processor invokes and performs operations corresponding to the foregoing functional units.

When the processing unit 1101 is a processor and the transceiver unit 1102 is a transceiver, a specific structure of the data transmission apparatus shown in FIG. 11 may be the communication device shown in FIG. 4. Descriptions of all related content of the components in FIG. 4 may be cited in function descriptions of the corresponding components in FIG. 11. Details are not described herein again.

An embodiment of this application further provides a computer-readable storage medium. The computer-readable storage medium includes computer program code. When the computer program code is run on a processor, the processor is enabled to perform the data transmission method shown in FIG. 5.

An embodiment of this application further provides a computer program product. The computer program product includes program instructions. When the program instructions are executed, the data transmission method shown in FIG. 5 is implemented.

The method or algorithm operations described in combination with the content disclosed in this application may be implemented by hardware, or may be implemented by a processor by executing software instructions. The software instructions may include a corresponding software module. The software module may be stored in a random access memory (RAM), a flash memory, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. An example storage medium is coupled to the processor, so that the processor can read information from the storage medium and can write information into the storage medium. Certainly, the storage medium may alternatively be a component of the processor. The processor and the storage medium may be located in an ASIC. In addition, the ASIC may be located in a core network interface device. Certainly, the processor and the storage medium may alternatively exist in the core network interface device as discrete components.

A person skilled in the art should be aware that in the foregoing one or more examples, functions described in the present invention may be implemented by hardware, software, firmware, or any combination thereof. When software is used for implementation, these functions may be stored in a computer-readable medium or transmitted as one or more instructions or code on the computer-readable medium. The computer-readable medium includes a computer storage medium and a communication medium. The communication medium includes any medium that enables a computer program to be transmitted from one place to another place. The storage medium may be any available medium accessible to a general-purpose computer or a dedicated computer.

The objectives, technical solutions, and beneficial effect of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions in the present invention shall fall within the protection scope of the present invention.

What is claimed is:

1. A data transmission method for power line communication, comprising:

allocating, by a master device, a first time-frequency resource block to a terminal device, wherein the first time-frequency resource block is determined based on an available frequency band locally stored in the master device, the available frequency band comprises M consecutive subcarriers, an orthogonal frequency division multiplexing (OFDM) symbol in the first time-frequency resource block comprises N discrete subcarriers in a frequency domain, wherein M and N are integers, and M is greater than N, and wherein a same quantity of subcarriers are spaced between two neighboring subcarriers in the N discrete subcarriers, locations of the N discrete subcarriers are related to a quantity of divided resources and an initial subcarrier location, and the quantity of divided resources is K, the quantity of subcarriers spaced between two neighboring subcarriers is K−1, and K is an integer; and transmitting, by the master device, data to the terminal device on the first time-frequency resource block.

2. The method according to claim 1, wherein transmitting the data to the terminal device on the first time-frequency resource block comprises:

transmitting, by the master device, the data to the terminal device on the first time-frequency resource block based on a duplicated modulation and coding scheme.

3. The method according to claim 1, wherein transmitting the data to the terminal device on the first time-frequency resource block based on a duplicated modulation and coding scheme comprises:

transmitting, by the master device, the data to the terminal device on the first time-frequency resource block based on a robust communication mode (RCM) or a robust mode of communication (ROBO) mode.

4. The method according to claim 1, wherein when the M consecutive subcarriers are M consecutive available subcarriers, the quantity of subcarriers spaced between two neighboring subcarriers is a quantity of available subcarriers.

5. The method according to claim 1, wherein when the M consecutive subcarriers are M consecutive physical subcarriers, the quantity of subcarriers spaced between two neighboring subcarriers is a quantity of physical subcarriers.

6. The method according to claim 1, wherein the transmitting, by the master device, data to the terminal device on the first time-frequency resource block comprises:

sending, by the master device, data to the terminal device on the first time-frequency resource block; or receiving, by the master device, data from the terminal device on the first time-frequency resource block.

7. The method according to claim 1, further comprising:

sending, by the master device, scheduling information to the terminal device, wherein the scheduling information comprises indication information, and the indication information indicates a time-frequency resource location of the first time-frequency resource block corresponding to the terminal device.

8. A data transmission method for power line communication, comprising:

receiving, by a terminal device, scheduling information from a master device, wherein the scheduling information comprises indication information that indicates a time-frequency resource location of a first time-frequency resource block corresponding to the terminal device, the first time-frequency resource block is determined based on an available frequency band locally stored in the master device, the available frequency band comprises M consecutive subcarriers, an orthogonal frequency division multiplexing (OFDM) symbol in the first time-frequency resource block comprises N discrete subcarriers in frequency domain, wherein M and N are integers, and M is greater than N, and wherein a same quantity of subcarriers are spaced between two neighboring subcarriers in the N discrete subcarriers, locations of the N discrete subcarriers are related to a quantity of divided resources and an initial subcarrier location, and the quantity of divided resources is K, the quantity of subcarriers spaced between two neighboring subcarriers is K−1, and K is an integer; and transmitting, by the terminal device, data on the first time-frequency resource block based on the scheduling information.

9. The method according to claim 8, wherein transmitting the data on the first time-frequency resource block based on the scheduling information comprises:

transmitting, by the terminal device, the data on the first time-frequency resource block based on a duplicated modulation and coding scheme.

10. The method according to claim 9, wherein transmitting the data on the first time-frequency resource block based on a duplicated modulation and coding scheme and the scheduling information comprises:

transmitting, by the terminal device, the data on the first time-frequency resource block based on a robust communication mode (RCM) or a robust mode of communication (ROBO) mode.

11. The method according to claim 8, wherein when the M consecutive subcarriers are M consecutive available subcarriers, the quantity of subcarriers spaced between two neighboring subcarriers is a quantity of available subcarriers.

12. The method according to claim 8, wherein when the M consecutive subcarriers are M consecutive physical subcarriers, the quantity of subcarriers spaced between two neighboring subcarriers is a quantity of physical subcarriers.

13. The method according to claim 8, wherein transmitting the data on the first time-frequency resource block based on the scheduling information comprises:

sending, by the terminal device, data on the first time-frequency resource block based on the scheduling information, or receiving data on the first time-frequency resource block based on the scheduling information.

14. A data transmission apparatus, comprising:

a transceiver; and a processor configured to:

allocate a first time-frequency resource block to a terminal device, wherein the first time-frequency resource block is determined based on an available frequency band locally stored in the data transmission apparatus, the available frequency band comprises M consecutive subcarriers, an orthogonal frequency division multiplexing (OFDM) symbol in the first time-frequency resource block comprises N discrete subcarriers in frequency domain, wherein M and N are integers, and M is greater than N, and wherein a same quantity of subcarriers are spaced between two neighboring subcarriers in the N discrete subcarriers, locations of the N discrete subcarriers are related to a quantity of divided resources and an initial subcarrier location, and the quantity of divided resources is K, the quantity of subcarriers spaced between two neighboring subcarriers is K−1, and K is an integer; and transmit data to the terminal device on the first time-frequency resource block by using the transceiver.

* * * * *